Jan. 25, 1927.
A. ROELANDTS
1,615,653
SHOCK ABSORBER FOR SUSPENDED VEHICLES
Filed July 9, 1925
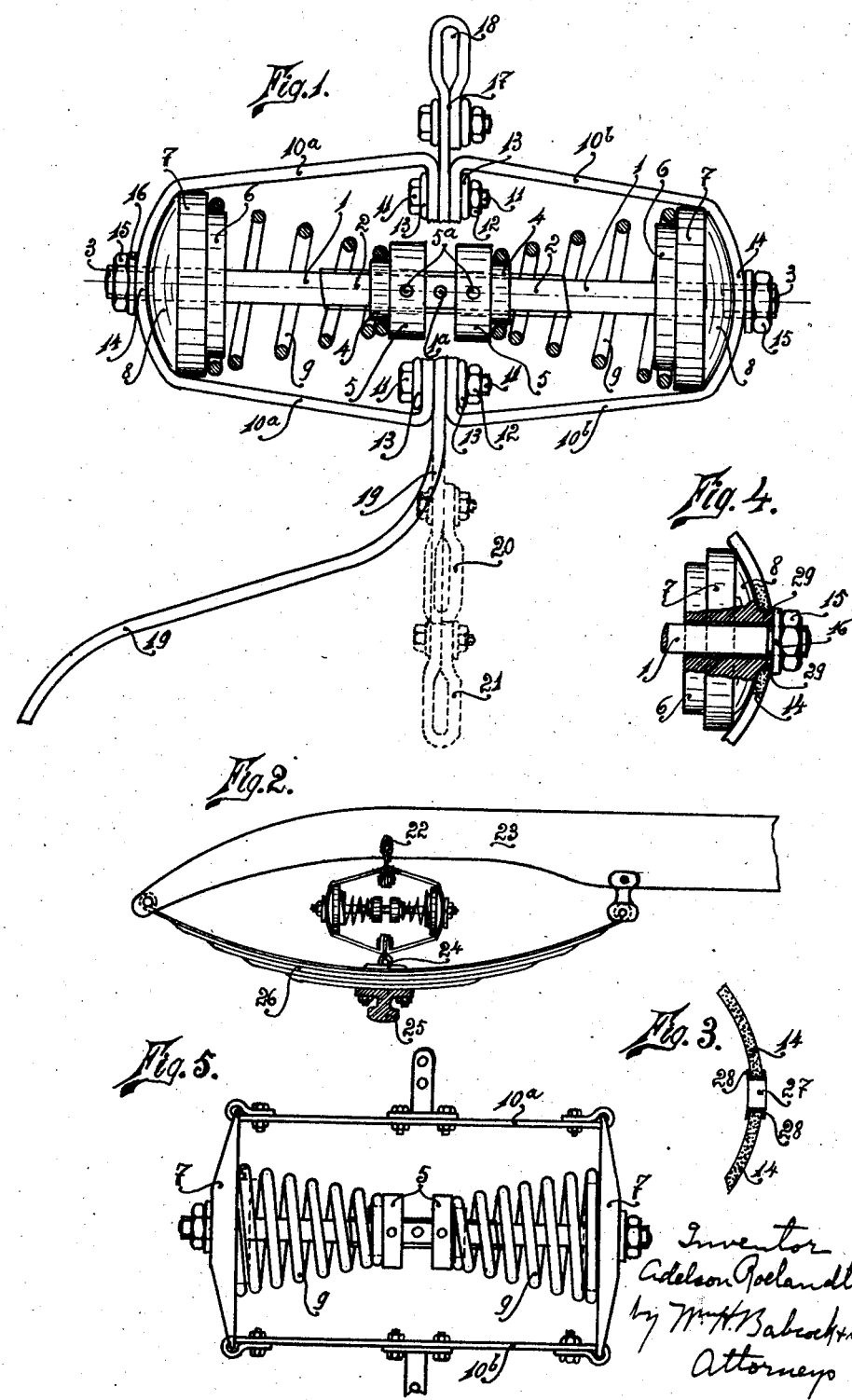

Patented Jan. 25, 1927.

1,615,653

UNITED STATES PATENT OFFICE.

ADELSON ROELANDTS, OF WACKEN, NEAR COURTRAI, BELGIUM.

SHOCK ABSORBER FOR SUSPENDED VEHICLES.

Application filed July 9, 1925, Serial No. 42,363, and in Belgium July 17, 1924.

This invention relates to vehicle shock absorbers of the general type having a guiding rod with helical springs arranged about said rod and attached to the opposed parts of the vehicle, as for instance to the chassis and to the axles by means of a suitable strap or the like.

The object of this invention is to provide a shock absorber of the above mentioned type as a self-contained unit, this unit being independent of the parts of the vehicles to which it may be attached whereby it may be quickly and easily attached to or detached from the chassis and axle respectively, or other relatively movable parts, of a vehicle, so as to be interchangeable from one automobile or other vehicle to anther practically instantaneously.

The shock absorber of the present invention comprises a leather belt, or strap, or the like, which forms a closed band, this band acting by two opposed portions upon said springs and being provided in each of said portions with a hole or the like, through which pass the corresponding extremities of said guiding rod supporting said springs, such belt or band being attached to the respective parts of the vehicle at points, which are symmetrically disposed in an angular relationship of 90 degrees with respect to said holes or the like.

The annexed drawings represent by way of example two embodiments of the present invention.

Figure 1 represents a lateral elevation of the shock absorber, partly in section.

Figure 2 represents the shock absorber fastened to the front axle and to the corresponding part of an automobile chassis.

Figures 3 and 4 represent details of construction; and

Figure 5 represents a view similar to Fig. 1 of a modified form of the invention.

The shock absorber comprises: a guiding rod 1 screw threaded upon its middle part 2 and at its end portions 3; nuts 4 screwed upon the middle part 2 of said rod, said nuts having an enlarged portion or collar 5; spring influencing disks or plates 6 slidably disposed upon the nonthreaded portions of rod 1, said disks having enlarged portions or collars 7 and preferably spherical outer faces 8; springs 9, which are preferably conoidal springs, interposed each between the collar portion 5 of a nut 4 and the collar portion 7 of the corresponding disk 6, said springs being maintained in concentric relationship with regard to parts 1, 4, 6 by the reduced portions of parts 4 and 6; a leather strap or the like, which according to the example shown is subdivided into two parts 10$^a$, 10$^b$ of equal length joined together by any suitable means, as for instance by bolts 11 with nuts 12 and washers 13, thus forming a closed belt or band through which the rod 1 passes at 14, suitable holes being provided for this purpose in the said belt or band at 14; nuts 15 and washers 16 serving to limit the outward movement of the blocks 6.

As shown the belt or band comprised of 10$^a$, 10$^b$ laces the resilient mechanism 1, 4, 6, 9 through the fact, that it passes about the spherical faces 8 of blocks 6, the position of said belt or band relatively to said mechanism being assured by the fact that the rod 1, or more properly its end portions 3 pass through holes provided at 14 within said belt or band.

According to the example shown, the attachment of the shock absorber to the corresponding parts of the vehicle is accomplished, on the one hand, by means of an auxiliary strip 17, one end of which is pressed between the upper jointed ends of buckle portions 10$^a$, 10$^b$ of said band, whereas its other end is turned up and held in convenient position by means of a securing device similar to the devices 11, 12, 13, to form a loop or eye 18, and on the other hand by means of a second auxiliary strip 19, one end of which is secured between the lower jointed ends of portions 10$^a$, 10$^b$ of said band, whereas its free end,—which is preferably of greater length than that of strip 17, to suit requirements of different vehicles,—may also be turned up and conveniently fixed to form a loop or eye 20 or 21 as shown in dotted lines.

Now, according to Figure 2 the shock absorber described, is attached by means of loops or eyes 18 and 20 or 21 to a stud or hook, or equivalent part 22 fixed for instance to the chassis frame 23, and to a suitable bracket, or other equivalent part 24, fixed for instance to the axle 25 (or equivalent part) of the vehicle.

According to Figure 2 the vehicle spring 26 is represented in its middle or normal, or neutral position. In this position the springs 9 of the shock absorber are already slightly compressed.

The operation of the shock absorber is as follows: If the wheels of the vehicle pass over a depression in the road the spring 26 will expand, this expansion of spring 26 moving the points 22 and 24, to which the shock absorber is attached, away from each other, thereby causing the compression of springs 9, which compression in its turn retards or counterbalances said expansion of spring 26. On the other hand, if the wheels of the vehicle pass over a hump of the road, the spring 26 is compressed, whereby the points 22, 24 approach each other, this movement and consequently the compression of spring 26 permitting the springs 9 to expand, such expansion assisting said compression of spring 26. Now, in both cases the chassis 23 will have the tendency to rebound upon springs 26 by virtue of reaction. This rebound movement of the chassis will equally cause the compression of springs 9 such compression counterbalancing or holding down said rebounding movement of the chassis.

For regulating the tension of springs 9 the portions 5 of nuts 4 are provided with holes 5ª. Similarly the rod 1 may be provided with a perforation or holes 1ª.

Thus it will be sufficient to introduce the extremity of a tool or for instance a pin or nail within hole 1ª on the one hand and one of the holes 5ª on the other hand, to communicate to nuts 4, 5 a rotary movement in either direction, thereby regulating the tension of springs 9.

It is obvious that each of the nuts 4, 5 and 15 may cooperate with a jam-nut, not shown in the drawings, serving to maintain said nuts in the desired position.

Figures 3 and 4 represent by way of example how the parts 14 of the endless or closed belt or band, are protected against wear, which otherwise could occur through the sliding action, of rod 1 passing through said parts of the endless or closed belt or band. According to Figure 3, the hole in part 14 through which the rod 1 passes, is reinforced by means of a metallic sleeve part or eye 27 attached to part 14 in any well known manner, for instance by pressing the edges of said sleeve in such a manner as to form flange portions 28. Alternatively, according to Figure 4, the blocks or plates 6 may be provided upon their spherical faces 8 with tubular projections 29 which are respectively received in the perforations formed in the respective portions 14 of the endless or closed belt or band.

It is obvious that the endless or closed belt or band may be constituted of any other material than leather, as for instance, a textile fabric sufficiently strong and suitably impregnated material or the like.

Equally the loops or eyes 18, 20 or 21 may be formed by strips or parts of any suitable flexible or rigid material.

Finally it is to be observed, that by suitably increasing the diameter of the collar portions 7 of blocks or plates 6 the essentially horizontal parts of endless or closed belt or band may be brought at a sufficient distance from each other to permit the shock absorber to counterbalance or retard not only the expansion movement of springs 26 or equivalent movement of the chassis 23, but also the compression of said spring or equivalent movement of the chassis, so far as such compression or movement takes place beyond the normal or neutral position of parts 25, 26 and 23 with respect to each other, a shock absorber capable to operate in this way being shown in Figure 5.

Moreover according to Figure 5 the endless or closed belt or band instead of being subdivided into two parts as shown in Figure 1, may be subdivided into two straps, the ends of such straps being suitably attached to opposite edge portions of said blocks or plates so as to be disposed in essentially parallel relationship to each other, the middle portion of each strap being provided with suitable attaching means by which the shock absorber is removably attached to the respective parts of the vehicle.

What I claim is:

1. A shock-absorber for suspended vehicles to retard the expansion of the suspending means therefor, comprising a rod screw-threaded at its middle portion and at its end portions; adjustable nuts of suitable configuration screwed upon the threaded middle portion of said rod, suitable plates slidably disposed upon the nonthreaded portions of said rod, helical springs interposed between each of said nuts and the corresponding plate, a closed band of flexible and sufficiently resistant material, said band being provided at opposite sides with holes through which pass the end portions of said rod to permit said band to influence said plates, stop nuts screwed upon the threaded extremities of said rod, and means for attaching said band to the corresponding parts of the vehicle, said means being fixed to the buckle at points disposed symmetrically in an angular relationship of 90° with respect to the said holes provided in the buckle.

2. A shock absorber according to claim 1, in which said band is subdivided into two portions joined together at their ends by means of a clamping device, strips being interposed between said joined ends of the band, these strips being bent or turned up to form loops or eyes by means of which the shock absorber is removably attached to the respective parts of the vehicle.

3. A shock absorber according to claim 1, in which said holes in said band are reinforced by metallic sleeves with outwardly spread clamping flanges.

4. A shock absorber according to claim 1, in which the outer faces of said plates are of spherical shape.

In testimony whereof, I have signed my name to this specification at Antwerp, Belgium, this 24 day of June, 1925.

ADELSON ROELANDTS.